Oct. 9, 1956     M. P. HIGGINS ET AL     2,766,364

MACHINE TOOL

Filed Nov. 8, 1952     4 Sheets-Sheet 1

INVENTORS
MILTON P. HIGGINS
GEORGE E. COMSTOCK 3rd

BY George Comstock
ATTORNEY

Oct. 9, 1956 M. P. HIGGINS ET AL 2,766,364

MACHINE TOOL

Filed Nov. 8, 1952 4 Sheets-Sheet 2

INVENTORS
MILTON P. HIGGINS
GEORGE E. COMSTOCK 3rd.

BY George Comstock
ATTORNEY

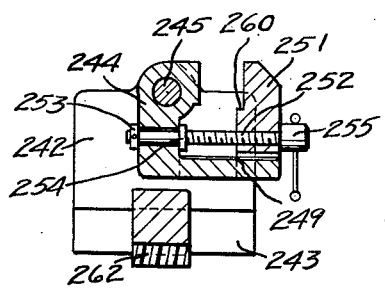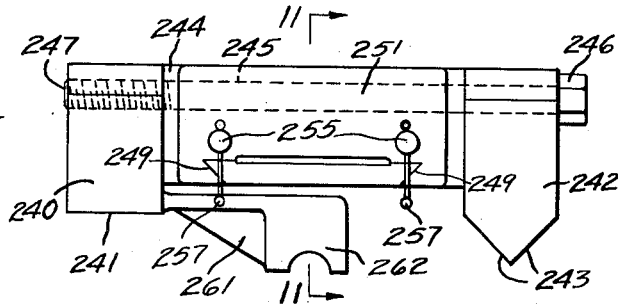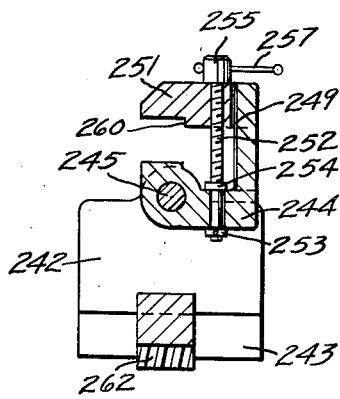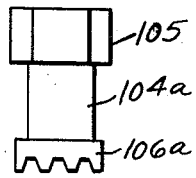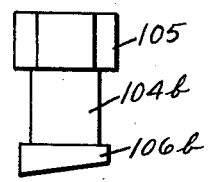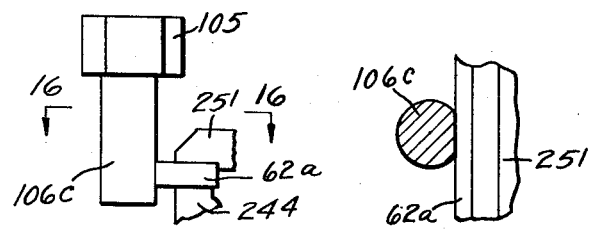

United States Patent Office 2,766,364
Patented Oct. 9, 1956

2,766,364
MACHINE TOOL

Milton P. Higgins, Worcester, and George E. Comstock 3d, Holden, Mass., assignors to Norton Company, Worcester, Mass., a corporation of Massachusetts Application November 8, 1952, Serial No. 319,464

6 Claims. (Cl. 219—69)

The invention relates to machine tools.

One object of the invention is to provide a machine tool to cut hard materials such as carbides at a high rate. Another object of the invention is to provide a machine tool analogous to a surface grinder to cut hard materials. Another object of the invention is to provide a machine tool adapted to cut at a high rate and giving a surface similar to a ground surface. Another object of the invention is to provide machine tool elements susceptible of being embodied in various types of machine tools of the entire range now covered by grinding machines and adapted to cut and finish many different shapes of surfaces. Another object of the invention is to provide a machine tool of the character indicated adapted also to machine softer materials such as various kinds of steel and also non-ferrous metals. Another object of the invention is to provide a machine tool especially for cutting hard surfaces, in the nature of a surface grinder and of great versatility. Another object is to provide a machine tool, especially for cutting hard surfaces, in the nature of a cylindrical grinder and of great versatility.

Another object is to provide a new method of eroding work pieces somewhat analogous to grinding. Another object is to provide a method of cutting hard carbides and the like with greater facility and speed. Another object is to provide a method for cutting hard materials rapidly yet permitting the achievement of a surface with a good finish.

Other objects will be in part obvious or in part pointed out hereinafter.

In the accompanying drawings illustrating one of many possible embodiments of the mechanical features of this invention including an alternate application of the main features, Figure 1 is a front elevation of a machine tool constructed in accordance with the invention, Figure 2 is a front elevation of a cross slide, to be substituted for the cross slide of Figure 1, and having work driving mechanism to rotate a work piece for cylindrical shaping.

Figure 3 is an elevation of a tool which can be used with the modification of Figure 2, Figure 4 is a side elevation of the machine tool of Figure 1, Figure 5 is a sectional view on an enlarged scale taken on the line 5—5 of Figure 4, Figure 6 is a sectional view on an enlarged scale taken on the line 6—6 of Figure 1, Figure 7 is an elevation of a tool which can be used in the modification of Figures 1 and 4 in an operation analogous to surface grinding, Figure 8 is a sectional view on an enlarged scale taken on the line 8—8 of Figure 1, Figure 9 is a wiring diagram.

Figure 10 is a front elevation and Figures 11 and 12 are cross sectional views showing different positions of the parts taken on the line 11—11 of Fig. 10 of a modified form of cross slide and vise for the cutting or shaping of a face of a work piece to a surface other than one normal to the jaws of the vise.

Figures 13 to 16 illustrate particular tools, Figure 16 being a section on 16—16 of Figure 15.

Figure 1:
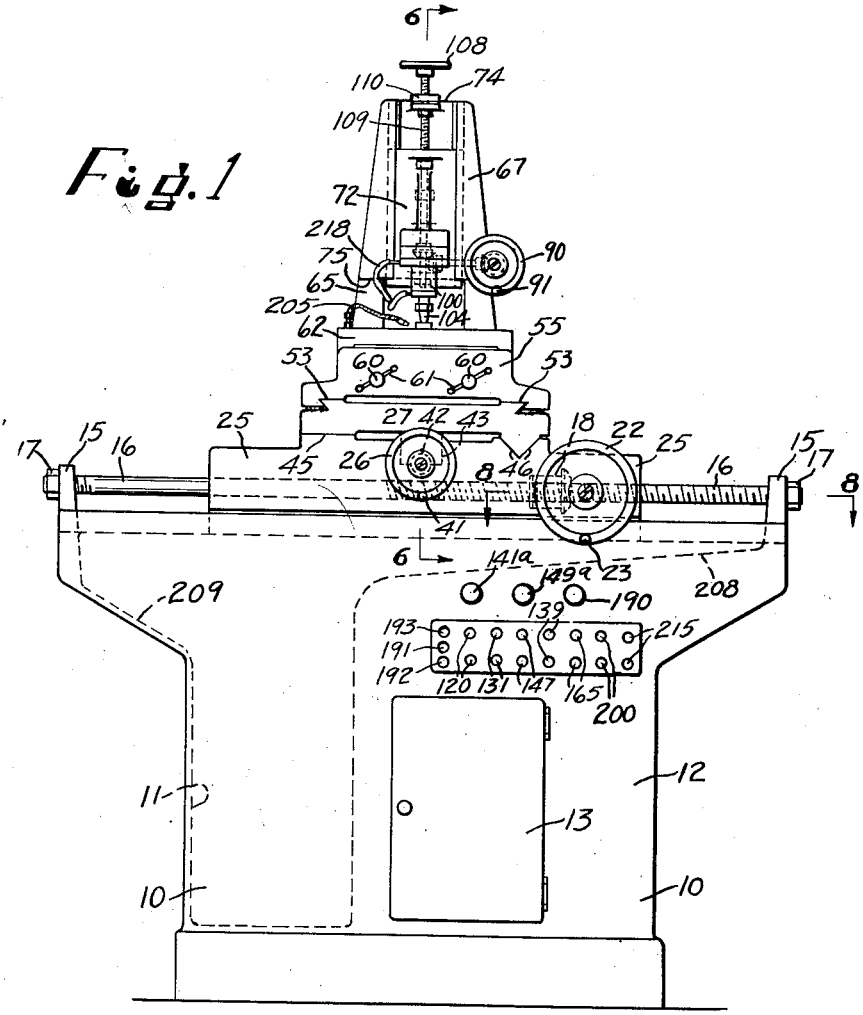
Figure 4:
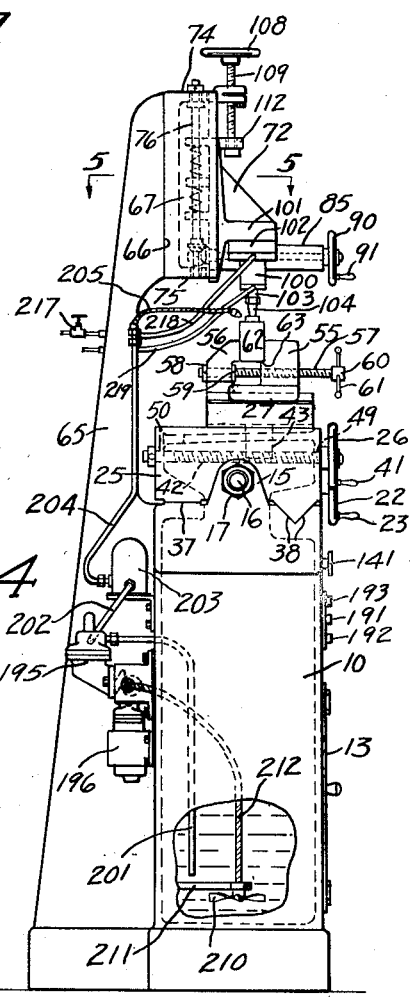

Referring now to Figures 1 and 4, the machine tool illustrated has a base 10 which is hollow and has a built-in tank 11 and a separate cabinet portion 12 normally closed by a door 13. In this cabinet portion 12 the electronic apparatus hereinafter identified in part and described in part may be located including tubes, transformers, resistances, capacitors and a converter to convert the normally available alternating current.

Figure 8:
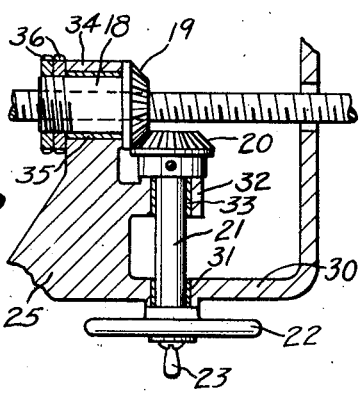

The upper surface of the base 10 has a pair of upstanding lugs 15 one at either side thereof through which extends a screw shaft 16 with nuts 17 thereon outside of the lugs 15 securely to hold the screw shaft 16 in place. Referring now to Figure 8, on the screw shaft 16 is a nut 18 having a bevel gear portion 19 meshing with a bevel gear 20 which is secured to a shaft 21 on the front end of which is secured a hand wheel 22 shown as having the conventional handle 23. The operator, by grasping the handle 23 or the hand wheel 22, can turn the shaft 21 thus turning the nut 18 which will thereupon move a table or carriage 25 to the right or to the left depending upon which way the hand wheel 22 is turned and of course rotating the hand wheel 22 clockwise can be arranged to drive the table 25 either to the right or to the left as desired. The shaft 21 is itself journalled in the table 25 in this illustrative embodiment of the invention although the arrangement could be otherwise. It is thought to be convenient, however, in this adaptation of the invention, to have the hand wheel 22 always in the same position relative to another hand wheel 26 which governs the cross slide 27, these parts being identified in Figure 1. Referring again to Figure 8, the table 25 has a wall 30 in which is a bearing 31 journalling the shaft 21 and also a projection 32 in which is another bearing 33 journalling the shaft 21. The table 25 has a further projection 34 having a bearing 35 secured therein by nuts 36 which bearing 35 journals the nut 18. As shown in Figure 4, the table 25 has a flatway 37 and V-ways 38 fitting complementary ways on the top of the base 10 to permit the table 25 to be traversed and positioned as desired, as in the case of many grinding machines.

Referring now to Figures 1 and 4, the hand wheel 26 may also have a conventional handle 41 and the operator, by grasping the handle 41 or the hand wheel 26, can turn a screw shaft 42 to which the hand wheel 26 is secured, thereby to position or feed the cross slide 27 and the thread of the screw shaft 42 can be such as to move the slide 27 toward the front or toward the rear on response to clockwse rotaton of the hand wheel 26. Referring to Figures 1 and 4, a half nut 43 is secured to the under side of the cross slide 27 and engages the screw shaft 42 for the aforesaid purpose. The cross slide 27 has a flatway 45 and V-way 46 resting on complementary ways formed on the upper side of the table 25 to permit cross feed and positioning as the case of many grinding machines. The screw shaft 42 is suitably journalled in the table 25 as by means of a front bearing 49 and a rear bearing 50.

Still referring to Figures 1 and 4, on the upper surface of the cross slide 27 is formed a dovetailed slideway 53 upon which rests a complementary dovetailed slideway portion of a movable vise jaw 55. A stationary vise jaw 56 is integral with the cross slide 7 and located behind the movable vise jaw 55. A pair of screw shafts 57 extend through and are journalled in the stationary vise jaw 56 and are held from longitudinal movement relative thereto by means of collars 58 and 59. On the front of these screw shafts 57 are secured the conventional hubs 60 having transverse holes therethrough through which extend slidable rods 61 so that the operator, by using the rods 61 as levers, can turn the screw shafts 57 to move the vise jaw 55 to clamp and unclamp a work piece 62. A shoulder 63 in the jaw 55 which has a horizontal upper surface serves as a reference plane for the bottom of the work piece 62. It will now be seen that a work piece 62, which may for example be a piece of cemented tungsten carbide or the like, can be tightly gripped by the vise comprising the jaws 55 and 56 and associated parts and thus firmly secured to the cross slide 27 which can be moved in any direction in a horizontal plane by the combination of the hand wheels 22 and 26.

Figure 5:
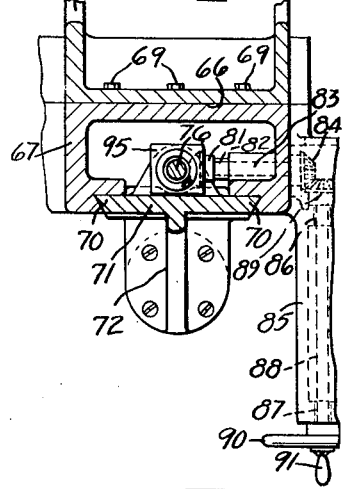
Figure 6:
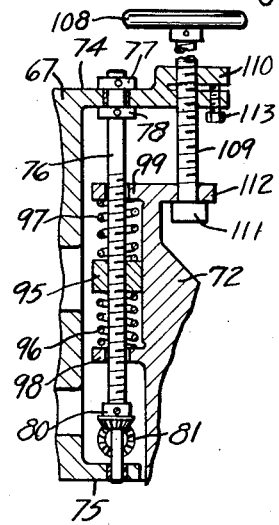

Referring now to Figure 4, a column 65 integral with the base 10 extends rearwardly thereof and also upwardly from the level of the flatway 37 to form a vertical plane surface 66. A tool head 67 has a plane surface 68 which is in contact with the surface 66 when bolts 69 attach the tool head 67 to the column 65 as is the case when the machine is assembled. Referring now to Figures 4, 5 and 6, formed on the front of the tool head 67 is a dovetailed slideway 70 in which fits a dovetail 71 of a tool slide 72. The tool head 67 is shaped like a box with one side partially open back of the slideway 70 and journalled in its upper and lower end walls 74 and 75 respectively is a rotatable screw shaft 76 having thrust collars 77 and 78 secured thereto to prevent movement in an axial direction. Referring especially to Figure 6, a bevel gear 80 is secured to the screw shaft 76 and meshes with a bevel gear 81 which, referring now to Figure 5, is secured to the end of a shaft 82 journalled in a boss 83 formed in the tool head 67, the shaft 82 extending through to the outside of the tool head 87 and having secured on the outside thereof a bevel gear 84. Formed integral with the tool head 67 is a cylindrical shaft housing 85 having bearings 86 and 87 for a forwardly extending shaft 88 to which is secured a bevel gear 89 meshing with the bevel gear 84. A hand wheel 90 is secured to the front of the shaft 88 and is shown as having a conventional handle 91. The operator, by grasping the handle 91 or the hand wheel 90, can turn the shaft 88 thus turning the shaft 82 thus to turn the screw shaft 76.

Referring to Figure 6, the screw shaft 76 passes through a nut 95 which is prevented from turning in any suitable manner, for example the nut 95 is shown as a square nut and one side thereof is in engagement with a vertical plane surface 96 of the tool slide 72. Thus turning of the screw shaft 76 tends to move the nut 95 up or down, and the arrangement can be as desired so that turning of the hand wheel 90 clockwise will move the nut 95 up or down. But the nut 95 is not rigidly secured to the tool slide 72; instead there is a spring 96 below it and a spring 97 above it, the former engaging a lower projection 98 extending rearwardly from the tool slide 72 and the latter engaging an upper projection 99 extending rearwardly from the tool slide 72. The screw shaft 76 extends through the springs 96 and 97 as well as through the projections 98 and 99.

Referring now to Figures 1 and 4, the tool slide 72 carries a transducer 100. A forwardly projecting portion 101 of the tool slide 72 has connected thereto a block of electrical insulating material 102 by which the transducer 100 is supported. In the transducer 100 and extending therefrom is a magnetostrictive rod 103. A tool 104 has a nut portion 105 by means of which it can be screwed onto the threaded end of the rod 103. The tool 104 preferably has a shaped end 106 which is shown as beveled or rounded at the edge and this end 106 may be of larger diameter than the rest of the tool 104 although not necessarily so. The tool 104 is preferably made of not too brittle material; for example it can be made of cold rolled steel or bronze.

By reason of the beveled edge of the end 106 of the tool 104, and by reason of the resilient mounting of the tool slide 72, the tool 104 can be moved from a point on the work piece which has been machined to below the general level to another area of higher level and the spring 96 will crush to permit this action. Furthermore when the operator, by turning the hand wheel 90 sufficiently causes the tool end 106 to contact the work piece 62, there is no pressure between them until the operator turns the hand wheel 90 a little more to take some of the load off the spring 97, for it will be obvious that when the tool 104 is not in engagement with any work piece 62 the weight of the tool slide 72 is balanced by the spring 97. Thus the machine provides for adjustable pressure between the tool 104 and the work piece 62. However the operator can predetermine the ultimate lowermost position of the bottom of the tool 104 by adjusting a hand wheel 108 secured to a screw shaft 109 which extends through an internally threaded split portion 110 of the tool head 67 and has a head 111 under a projection 112 through which it extends. A bolt 113 extending through the bottom of the split portion 110 and abutting the top portion thereof will, if tightened, cause the threads in the portion 110 to bind the threads of the screw shaft 109 sufficiently to prevent any accidental movement of the hand wheel 109 induced, for example, by vibration.

The transducer 100 is an apparatus for vibrating the rod 103 in the direction of its axis. For example, U. S. patent to Professor George W. Pierce of Harvard, No. 1,750,124, shows how a rod or core can be caused to vibrate along its axis. A standing wave is set up in the rod, which is usually made of nickel or a nickel alloy, and a point near the center called the node doesn't move but the ends partake of vibration induced by the magnetostrictive effect. See also Professor Pierce's U. S. Patent No. 1,882,397.

The magnetostrictive effect is produced in a rod of suitable material, such as nickel, when it is the core of a winding which is energized by alternating current and the magnetostrictive effect is more efficient for my purposes when there is a biasing polarity which can be produced by magnetizing the rod or by providing a biasing coil energized by direct current. If the rod or core is of uniform diameter and material the node is at the center but the tool 104 partakes of the vibrations and this may be of different material or of different diameter in part and this may displace the node slightly from the center of the system although the node will still be pretty close to the central point of the combined rod 103 and tool 104.

Figure 9:
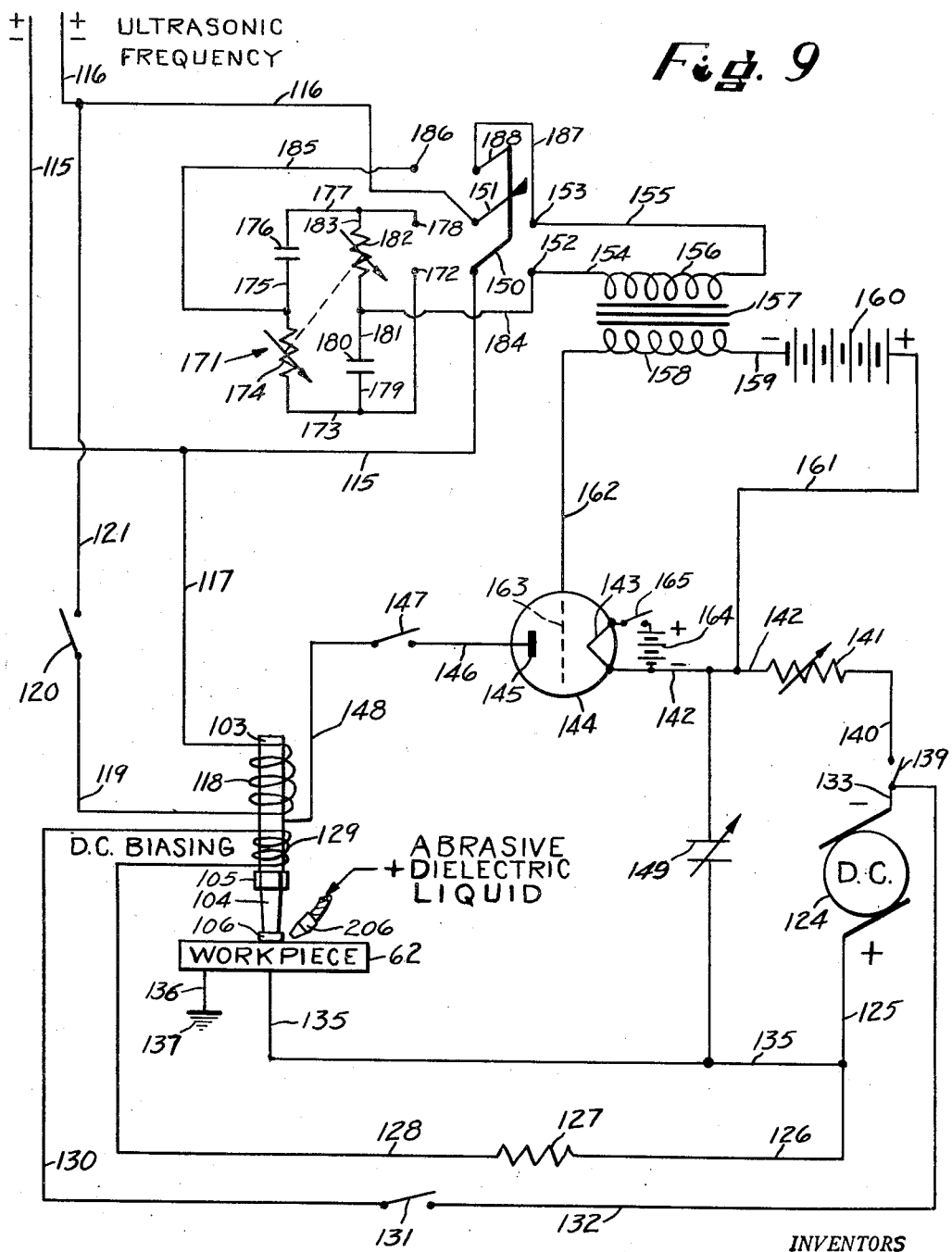

Referring now to Figure 9, we have diagrammatically illustrated an electric circuit which at once energizes the rod 103 to produce vertical vibrations and also causes a spark discharge between the shaped end 106 of the tool 104 and the work piece 62. We further provide apparatus to pump a slurry of abrasive and non-conductive liquid to the area between the tool end 106 and the work piece 62 but this will be described later. Under the triple influence of vertical vibrations, which in accordance with this invention are ultrasonic, the slurry of abrasive, which is preferably boron carbide, and the constant spark discharge, the work piece is quickly eroded and a good surface is produced. As indicated in the objects this machine tool is especially designed to work very hard materials such as the cemented carbides, that is to say tungsten carbide and/or tantalum carbide and/or titanium carbide etc. bonded with metal which is usually cobalt or nickel. The machine tool can also be used to shape hot molded carbides having no metal bond. For example for many years boron carbide has been molded into monolithic pieces and boron carbide is the hardest known material next to the diamond. Such molded boron carbide can be shaped by erosion in accordance with this invention whereas it is difficult to shape it in any other way except with diamond grinding wheels but the present machine tool is more versatile in a number of ways than a grinding machine having a diamond wheel. Furthermore the cost of shaping boron carbide by the machine of this invention is less than the cost of shaping it with diamond wheels.

Referring now to Figure 9, we provide electromotive force of alternating polarity of ultrasonic frequency, that is to say supersonic frequency. This frequency should be at least 16,000 cycles per second and preferably more because the supersonic frequencies are more efficient in this invention and furthermore if supersonic frequencies weren't used the machine would make a noise which would be disagreeable not only to the operator but to others necessarily in the same room or building. How to provide an electromotive force of alternating polarity at frequencies of above 16,000 cycles per second is known and we shall therefore not describe same. While very high frequencies might be useful for eroding the metal, we see no reason for going higher than 100,000 cycles per second and to do so is expensive and also is liable to interfere with radio and television apparatus in the vicinity. However, frequencies higher than 100,000 cycles per second could be used. In this range, we prefer frequencies of the order of about 25,000 to 35,000 cycles per second. However, in any case, we prefer to use the resonant frequency of the core rod 103, that is we deliberately match the frequencies of the power source and of the core rod as this gives the greatest efficiency.

In Figure 9 the source of ultrasonic, that is to say supersonic electric energy is represented by the lines 115 and 116. The line 115 is connected by a conductor 117 to a high frequency coil 118 around the rod 103, and the other end of the coil 118 is connected by a conductor 119 to a switch 120, the other end of which is connected by a conductor 121 to line 116.

Most machine shops have alternating current available at E. M. F. of 220 or 550 volts. For the purposes of the invention direct current is wanted which can be obtained from any suitable source but conveniently a converter, involving a motor and a generator, is provided in the cabinet portion 12 of which only the direct current generator element 124 is indicated in Figure 9. In this figure the positive side is shown as connected by a connected by a conductor 125, a conductor 126, a resistance 127 and a conductor 128 to a D. C. biasing coil 129 the other side of which is connected by a conductor 130 to a switch 131 to a conductor 132 to a conductor 133 to the negative side of the generator 124.

A conductor 135 connects the work piece 62 to the conductor 125 and thus the work piece 62 is positive. The work piece 62 is grounded into the machine tool as indicated by conductor 136 connected to the work piece and to ground 137; this is diagrammatic and the result is achieved by failing to insulate the work piece 62 from the vise 55—56 as the vise is of course made of metal. This expedient protects the operator who, however, should be careful not to touch the tool 104 while the machine is operating.

The conductor 133 is connected by a switch 139 and a conductor 140 to a variable resistance 141 which is connected by a conductor 142 to the filament 143 of a power triode tube 144 the plate 145 of which is connected by a conductor 148 to the magnetostrictive rod 103 preferably at the node thereof which doesn't vibrate. Thus a circuit is established between the shaped end 106 of the tool 104 and the work piece 62 and a variable condenser 149 is connected across the circuit to conductors 135 and 152 so that the discharge is a spark discharge. We preferably provide means for causing the sparks to discharge at the same frequency as that at which the tool vibrates.

To this end the line 115 is connected to a switch arm 150 while the line 116 is connected to a switch arm 151. Switch poles 152 and 153 are connected by conductors 154 and 155 to the primary 156 of a transformer 157. The secondary 158 of the transformer 157 is connected by a conductor 159 to the negative pole of a battery 160 the positive pole of which is connected by a conductor 161 to the conductor 142. The other side of the secondary 158 is connected by a wire 162 to the grid 163 of the tube 144. An A battery 164 energizes the filament 143 and can be disconnected by means of a switch 165.

It will be seen that when the switch arms 150 and 151 engage the poles 152 and 153, the tube 144 operating as a valve causes a discharge between the work piece 62 and the end 106 for every vibration of the latter. By reason of the variable condenser 149 and the variable resistance 141 the circuit can be set so that sparks are produced substantially only by the discharge of the condenser 149. We desire to avoid a flow of energy of such parameters that the discharge could properly be called an arc discharge. Spark discharge leaves no bad effect upon the work piece, permits working to extremely fine limits and there is also no change in the structure of the metal being worked.

We may further provide means for selecting the exact point in each cycle of vibrations at which the spark discharge takes place. In Figure 9 we have illustrated a phase changer 171 comprising a switch pole 172 connected by a conductor 173 to a variable resistance 174 which is connected by a conductor 175 to a condenser 176 which is connected by a conductor 177 to a switch pole 178. The conductors 173 and 177 are cross connected by a conductor 179, a condenser 180, a conductor 181, a variable resistance 182, and a conductor 183. The conductor 181 is connected by a conductor 184 to the switch pole 152 while the conductor 175 is connected by a conductor 185 to a switch pole 186. The switch pole 153 is connected by a conductor 187 to a switch arm 188 mechanically coupled to the arms 150 and 151. (The arms 150, 151 and 188 are insulated from each other.) When the switch arms 150, 151 and 188 are respectively connected to the poles 172, 178 and 186 the phase changer 171 controls the phase of the sparks relative to the vibrations of the tool 104. The variable resistances 174 and 182 are mechanically connected so that the resistance in one can be increased as the resistance in the other is increased, maintaining the two always equal, and in Figure 1 a knob 190 is provided to change these resistances and to set the phase accordingly. In Figure 1 the middle button 191 is used to place the switch 150, 151, 188 in neutral, the button 192 is used to throw the arms to the right, Figure 9, and the button 193 is used to throw the arms to the left. It will be understood that Figure 9 is diagrammatic and that modern switches are operated by buttons but it is unnecessary to illustrate the mechanical features of a switch herein. The diagram is illustrative of knife switches heretofore generally used and now superseded by button-type switches.

Referring now to Figure 4, we provide a diaphragm pump 195, operated by a motor 196 which is started and stopped by a switch controlled by push-buttons 200 on the front of the machine, Figure 1. The intake pipe 201 of the pump 195 extends into the tank 11 and the outlet pipe 202 from the pump 195 goes to an air dome accumulator 203 to which an outlet pipe 204 is connected. The pipe 204 has on the upper end thereof an adjustable hose 205 with a nozzle 206. The hose 205 can be a rubber hose with a wound metal sheathing of the type which permits ready deformation to move the nozzle 206 to the desired point but which sheathing is rigid enough so that once the nozzle has been positioned it will retain its position until reshaped by a strong hand. Fluid discharged through the nozzle 206 floods the work piece 62 and carries the abrasive, for example boron carbide, between the tool end 106 and the work piece and eventually the liquid and the abrasive flow downwardly through the table 25 into the tank 11 whose right-hand wall includes a long gently inclined plane 208 to collect fluid from the right-hand side of the machine and a not so long inclined plane 209 which is part of the base casting to collect fluid from the left-hand side of the machine whereas the general shape of the table 25 and the fact that it has many openings therein prevent fluid from spilling over at the front or at the back of the machine. In order to keep the abrasive well dispersed through the liquid we provide an agitator which may be in the form of a propeller or screw 210 supported by a bracket 211 extending into the tank 11 from the machine base 10, the propeller 210 being driven by a flexible shaft in a sheathing 212 which is connected to be driven by the motor 196 by a simple gearing which it is not necessary herein to illustrate.

With regard to the liquid to use, it should be (1) electrically non-conductive; (2) highly cavitating; (3) non-inflammable; (4) non-toxic; (5) non-anesthetic; (6) non-corrosive; and (7) stable. With regard to requirement No. 2, highly cavitating, this in turn involves especially low viscosity, also low vapor pressure, high latent heat, and high thermal conductivity. Probably no liquid has all of these qualities to a maximum extent but many liquids have all of these qualities to a sufficient extent to be highly practical. The order of importance of the qualities is believed to be about as above given. Many commercial plastics have the above qualities to a sufficient degree to be usable in the invention and selection should be made of those having low viscosity. The requirement that the liquid be non-anesthetic rules out some low carbon chlorine compounds which otherwise would be quite satisfactory but in certain applications exhaust fans and the like would be used so that the liquid would not have to be non-anesthetic. Particular examples of liquids quite practical in the present invention are the chlorinated paraffins of from 9 to 12 carbon atoms particularly the tetrachloro compounds such as tetrachlorononane, tetrachlorodecane, tetrachloroundecane and tetrachloroduodecane. However these compounds if pure are unreasonably expensive but commercial liquids which are impure mixtures of the above, not all of the components having four chlorine atoms, are quite practical and usable in this invention and are inexpensive. Electrically non-conductive liquid is also referred to herein as dielectric liquid.

A typical procedure of operating the machine will now be described as a possible aid in a fuller understanding thereof. Let it be assumed that, of the push-buttons shown in pairs in Figure 1, the upper one in each case is the circuit engaging button. Let it further be assumed that all of the circuits indicated are open. The operator will first clamp the work piece 62 in the vise 55—56 which needs no further description. Then, manipulating the hand wheels 22 and 26, to bring part of the work piece 62 under the tool end 106, the operator should turn the hand wheel 90 to cause the tool end 106 gently to contact the work piece. The hand wheel 108 should then be turned, first to bring the head 111 into contact with the projection 112 without separating the tool end 106 from the work piece, and then, in the opposite direction, to predetermine the amount of cut.

Now the operator closes a number of switches. A pair of push-buttons 215 on the front of the machine represent a switch for energizing the motor component, not shown, of the converter of which the generator 124 is a part and the upper button 215 should be pushed in. The upper button 200 should be pushed in to start the motor 196 to work the pump 195 and rotate the screw 210. Switches 120 and 131 should be closed by pushing the upper buttons thereof to energize the transducer 100. Switches 139 and 147 should be closed by pushing the upper buttons thereof to energize the sparking circuit which, however, will not operate until the filament 143 is lighted. So therefore the switch 165 for the A battery should be closed by pushing the upper button thereof and either the button 192 or the button 193 should be pushed in.

The order of doing these things is not important but it will be noted that by leaving open the switch 120, the work piece 62 can be eroded by spark discharge without supersonic vibration (using a light pressure between the tool and the work piece) and by leaving open the switch 147, and preferably also the switches 139 and 165, the work piece can be eroded by supersonic vibration without sparking. Before or as soon as the transducer 100 is energized as by closing the switches 120 and 131, cooling water should be supplied to the transducer to prevent it from over heating. This is done by turning a water valve 217, Figure 4, connected by piping 218 to the transducer 100 having piping 219 to discharge the water.

The operator then moves the hand wheels 22, 26 and 90 in any order of movement used for any order of traversing cross feeding and down feeding in a surface grinder or a milling machine of which there are many variants. Eventually this machine tool operation erodes or cuts the work piece to the desired size and the operation for a particular cut thereof is ended when the head 111 engages the projection 112.

In Figure 1, we have shown knobs 141a and 149a and these respectively operate the variable resistances 141 and the variable condenser 149. During the operation these knobs 141a and 149a are manipulated to give the maximum cut. They should be worked together as they affect the same circuit. The knob 190 should also be manipulated to give the maximum cut. A priori the exact setting therefor will not be known because the phase of the spark which produces the best cutting rate may be different for different tools, different work pieces, and different intensities of spark and also other variables may enter. The phase changer 171 takes an appreciable amount of power which is subtracted from the power delivered to the transducer 100 so after the best setting of the knob 190 has been determined, the push-button 192 should be pushed to swing the switch arms 150 and 151 to the right to see if sparking in uncorrected phase will not do as well or better. In this connection the machine can be set up for high speed cutting of the work piece or for producing the best surfaces all the more readily because, by means of the switches as explained, either the magnetostriction vibration or the sparking can be isolated.

Another feature of the invention is that the tool is adapted to cut or erode non-conductive materials as well as conductive materials because the sparking circuit can be left open and the cutting can be done by supersonic vibrations assisted by the abrasive slurry. We believe that the supersonic vibrations erode the work piece by reason of causing cavitation of the liquid which in combination with the abrasive produces a cutting action. Vibrations of lower frequency, that is to say in the sonic range, are far less efficient. However, regardless of the theory, the results can be achieved in actual practice. While other abrasives such as silicon carbide, aluminum oxide, zirconia and diamond can be used, we believe boron carbide in finely divided form to be the best from the standpoint of reasonable cost and efficiency of cutting.

We further believe there is a conjoint action of the sparking and the supersonic vibrations operating by cavitation of the liquid and by means of the abrasive. In the first place the axial vibrations of the tool 104 intermittently separate it from the work piece thus providing a space for the spark discharge. Each spark is believed to loosen some molecules of the work piece. The cavitating liquid is believed to exert force enough upon such loosened molecules to wrench them from the body of the work piece while the abrasive erodes the peaks left by the molecules detached and thus the operation gradually cuts the work piece leaving, however, a surface matching the under side of the tool end 106. As before stated the tool 104 and its end 106, which are preferably integral and of the same material, can be made of relatively soft material such as cold rolled steel and bronze. Such soft material is not brittle. It is the brittleness of the work piece which causes it to be rapidly eroded and it is the lack of brittleness of the tool which causes it to stand up for a relatively long time. Of course in time the tool wears out but the tools are cheap and can be quickly replaced.

In Figure 9 the tube 144 might be used conjointly with many other tubes all connected in parallel. This would permit more power to be used for sparking. Additional condensers 149 and resistances 141 might also be provided, all in parallel with those shown in Figure 9. Thus the wiring diagram is diagrammatic and by the use of additional apparatus any amount of power can be provided for sparking.

The transducer 100 is a casing having the magnetostrictive rod 103 mounted therein and held thereto at the node of the rod. It is not believed necessary to show the mechanical details thereof as transducers of this nature are already known and in operation. For effective cooling of the rod 103 and of the coils 118 and 129, the water is allowed direct access to the rod and to the turns of the coils. The insulation is advantageously resin or polymer insulation such as thermo-irreversible phenol formaldehyde resin. Such insulation is very effective and by allowing the water to have direct access to the turns of the coils the cooling is very efficient. Hot water is exhausted from the piping 219 which can be used for any desired purpose.

Figure 2:
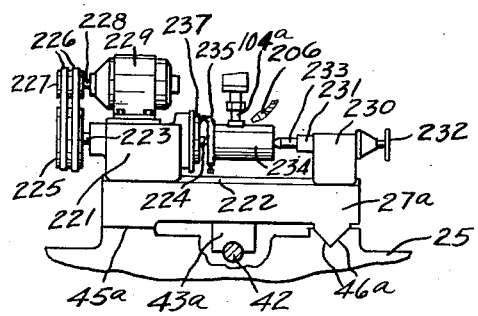
Figure 3:
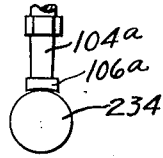
Figure 7:
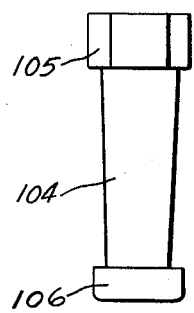

Referring now to Figure 2, we have therein shown the elements of a lathe. A cross slide 27a having a flat way 45a and V-ways 46a rests on the complementary ways of the upper side of the table 25. A half nut 43a engages the screw shaft 42 in the same manner as does the half nut 43. A work head 221 is adjustably secured to ways 222 on the cross slide 27a and this work head 221 has a spindle 223 journalled therein which is hollow and in which can be located a head center 224. Mounted on the spindle 223 is a pulley 225 driven by belts 226 from a pulley 227 on the motor shaft 228 of a motor 229 mounted on the work head 221. A footstock 230 is also adjustably secured to the ways 222 and has a center holder 231 which can be moved toward and from the work head 221 by means of a hand wheel 232. A tail center 233 is removably held by the center holder 231. The work piece 234 which is shown as a cylindrical piece is mounted between the centers 224 and 233 and can be rotated by the usual dog 235 the tail of which is in a slot in the usual face plate 237 secured to the spindle 233. Tapered and stepped, as well as straight, work pieces can be machined in this machine. As illustrated in Figure 3 the tool 104a has a shaped end 106a which is a cylindrical surface of larger radius than that of the work piece 234. In some cases, however, a flat bottom tool end might be used.

Referring now to Figures 10, 11 and 12, we provide a cross slide vise combination which can be substituted for the cross slide vise combination of Figures 1 and 4 merely by lifting the latter out of place and substituting the combination of Figures 10, 11 and 12. This combination comprises a flatway slide 240 having a flatway 241, a V-way slide 242 having V-ways 243 and these parts are separate pieces. A fixed vise jaw 244 is bored and receives a long bolt 245 which has a bolt head 246 outside of the V-way slide 242 and extends through the slide 242 and into a threaded bore 247 in the flatway slide 240 so that, when the bolt 246 is tightened, the three parts, namely the flatway slide 240, the fixed vise jaw 244 and the V-way slide 242, are held together as if they were an integral piece. Furthermore by reason of the wide area of contact between these parts the ways 241 and 243 are automatically aligned in one dimension. For aligning the ways 241 and 243 in the other necessary dimension it will suffice to have clamped a heavy lead weight in the vise while the bolt 245 is being tightened with possibly occasional tapping of the slides 240 and 242 with a lead hammer.

The fixed vise jaw 244 has a dovetailed slideway 249 upon which rests a complementary dovetailed slideway portion of a movable vise jaw 251. A pair of screw shafts 252 extend through and are journalled in the stationary vise jaw 244 and held from longitudinal movement relative thereto by means of collars 253 and 254. On the front ends of these screw shafts 252 are secured the conventional hubs 255 having transverse holes therethrough through which extend slidable rods 257 so that the operator, by using the rods 257 as levers, can turn the screw shafts 252 to move the vise jaw 251 to clamp and unclamp a work piece. As in the case of the embodiment of Figures 1 and 4, the holes in the jaw 251 are tapped so that they are in threaded engagement with the shafts 252. It will be seen that this construction is similar to that already described and a shoulder 260 in the jaw 251 the same as the shoulder 63 serves as a reference plane for the bottom of a work piece. Integrally secured to one of the slideways as for example to the slideway 240 by means of a bracket portion 261 is a half nut 262 corresponding to the half nut 43.

It will now be seen that in the modification of Figures 10, 11 and 12, the work piece can be clamped and unclamped by the vise in the same manner as in the case of the modification of Figures 1 and 4 and that the slide combination of Figures 10, 11 and 12 can be moved forward and back by turning the hand wheel 26. However in the case of the modification of Figures 10, 11 and 12, the inner faces of the jaws 244 and 251 can be vertical as shown in Figure 11, or horizontal as shown in Figure 12, or at any angle between these two positions. In fact the vise elements can be moved counter-clockwise even beyond the position shown in Figure 12. This combination permits shaping work pieces to all kinds of dihedral angles. Of course even with the vise of Figures 1 and 4, a taper can be produced on some work pieces by clamping them at an angle in the vise but for the cutting of non-parallel long sides on long work pieces the apparatus of Figures 10, 11 and 12 is more versatile.

It will be seen that the machine tool provides means for spacing a tool holder and a work holder and for urging them towards each other. The urging can be done by a spring or by gravity and in the present machine it is done by both acting conjointly, but magnetism as by the use of a solenoid and core could do the urging and would be equivalent. It will further be seen that, in order to produce the sparking, the machine provides means for making and breaking an electromotive force gradient between the tool holder and the work piece holder with the work piece holder positive and the tool holder negative. This electromotive force gradient has such parameters that it produces sparks but not arcs since, as indicated hereinbefore, we desire to avoid arcing but the foregoing is to be interpreted in a practical sense since the difference between a spark and an arc is to some extent a matter of degree. Practically the presence of the condenser 149 insures sparks and eliminates detrimental arcing but other electric circuits could achieve the same result. Preferably the electromotive force gradient is made and broken at a frequency in the range between 16,000 cycles and 100,000 cycles per second, and it is better that the frequency of such making and breaking be the same as that of the frequency of vibration of the tool holder, but ratios of small integers of the one frequency to the other frequency might be adopted, as for example, a vibration frequency of 25,000 cycles per second and a sparking frequency of 50,000 cycles per second or vice versa, or a sparking frequency of 20,000 cycles per second and a vibration frequency of 60,000 cycles per second or vice versa. This is referred to as "synchronized to" in the claims.

Preferably also the machine has means for setting the phase of the making and breaking of the electromotive force gradient relative to the vibration of the tool holder, embodied in the phase changer 171. This can also be used when the ratio is a small integer as above explained.

We use the word "cycle" in its usual sense, to mean a complete wave and the phase of the making and breaking relative to the vibration means when the gradient is made and broken on a time scale set by the vibrations. For example the making could be when the tool is farthest up or half way up going up, or half way down going down etc. It is desirable that there shall be a space, that is a considerable space between the tool and the work when the gradient is made, and that some space shall still exist when it is broken.

The maximum space between the work piece and the bottom of the tool end 106 is twice the amplitude of vibration plus something, because generally the end 106 does not actually touch the work piece when the end 106 is at the bottom of its stroke due to the presence of abrasive, e. g. boron carbide. We use the word "amplitude" herein to mean displacement from position of rest, as is usual, which is analogous to from the level sea to the crest of the wave (not from the trough to the crest). The amplitude of vibration using frequencies of from 16,000 to 100,000 cycles per second will necessarily be small, and with a given amount of power, the greater the frequency the less the amplitude. A good frequency of vibration to use is 28,000 cycles per second. Usually the amplitude in such a case will be of the order of one thousandth of an inch. In a practical machine according to this invention the amplitude will probably not exceed one hundredth of an inch nor fall below half of one ten thousandth of an inch.

The machine will usually have means for directing dielectric liquid between the tool holder and the work piece holder and into the locus of contact of the tool and the work piece. This might take the form of a mere pan to hold the liquid. Preferably also the liquid contains finely divided abrasive dispersed therein, e. g. boron carbide. But some materials can be eroded with the use of dielectric liquid but no abrasive, and for some operations the machine can be run dry, that is without any liquid at the cutting point. In such dry operations abrasive can be used in some cases and omitted in other cases. A dispersion of finely divided abrasive in liquid is properly referred to as a slurry.

It has hereinbefore been stated that the work piece is positive and the tool is negative and it has also hereinbefore been stated that the electrical discharge between the tool and the work piece should be by sparking and not by arcing. These statements go together. In arcing metal is lost from the negative terminal or electrode of the arc gap (where direct current is used), while in sparking metal is lost from the positive terminal or electrode of the gap (where direct current is used).

Referring now to Figure 13, this shows a tool 104a having a shaped end 106a in the form of rack teeth which will cut complementary rack teeth in a hard work piece. Figure 14 illustrates a tool 104b having a shaped end 106b at an acute angle to the horizontal which is usable in the machine and illustrates the proposition that, while the vibrations will usually be normal to the face of the work piece, they can be at a non-normal angle thereto. The work piece eroded by the tool of Figure 14 might originally have a horizontal surface which, by the erosion, would be made into an inclined surface, or it might originally be inclined at the same angle as the tool. A tool like the tool 104b of Figure 14 could be used with the vise of Figures 1 and 4 to form an inclined side on the long side of a work piece.

Figures 15 and 16 illustrate the proposition that the machine can be used for lapping. The vise jaws 244 and 251 are shown holding a work piece 62a whose vertical face is being lapped by the vertical vibrations, in the frequency range 16,000 to 100,000 cycles per second, of a tool 106c the vertical flat face of which is doing the lapping. Sparking is used in this embodiment and greatly accelerates the lapping which, using sparks at low potential of electromotive force, produces a good surface. In this case there is no advantage in matching the frequencies. For lapping the abrasive slurry will be used and in fact it will usually be provided to the locus of erosion in all of the embodiments of the invention although in some special cases it may be omitted.

It will thus be seen that there has been provided by this invention a machine tool and a method for eroding or cutting work pieces in which the various objects hereinabove set forth together with many practical advantages are successfully achieved. As many possible embodiments may be of the above invention and as many changes might be made in the embodiments above set forth, it is to be understood that all matter hereinbefore set forth or shown in the accompanying drawings is to be interpreted as illustrative and not in a limiting sense.

We claim:

1. A machine tool comprising a tool holder, a work piece holder, means for spacing said holders and for urging them towards each other, means vibrating said tool holder at a frequency of at least 16,000 cycles per second, means for intermittently making and breaking a sparking but non-arcing electromotive force gradient between said holders with the work piece holder positive and the tool holder negative in which the frequency of making and breaking the electromotive force gradient is synchronized to the frequency of vibration of the tool holder, means for setting the phase of the making and breaking of the electromotive force gradient relative to the vibration of the tool holder, and means for directing dielectric liquid containing finely divided abrasive between the holders and into the locus of contact of a tool carried by the tool holder and a work piece held by the work holder.

2. A machine tool comprising a tool holder, a work piece holder, means for spacing said holders and for urging them towards each other, means vibrating said tool holder at a frequency of at least 16,000 cycles per second, means for intermittently making and breaking a sparking but non-arcing electromotive force gradient between said holders with the work piece holder positive and the tool holder negative in which the frequency of making and breaking the electromotive force gradient is sychronized to the frequency of vibration of the tool holder, and means for setting the phase of making and breaking the electromotive force gradient relative to the vibration of the tool holder.

3. A machine tool according to claim 1 in which the work piece holder is adjustable to hold a work piece at different angles of inclination relative to the tool holder.

4. A machine tool according to claim 2 in which the work piece holder is adjustable to hold a work piece at different angles of inclination relative to the tool holder.

5. A machine tool according to claim 1 having means to rotate part of the work holder arranged thereby to rotate a work piece held by the work holder.

6. A machine tool according to claim 2 having means to rotate part of the work holder arranged thereby to rotate a work piece held by the work holder.

References Cited in the file of this patent

UNITED STATES PATENTS

| | | |
|---|---|---|
| 2,306,054 | Guyer | Dec. 22, 1942 |
| 2,337,341 | Miller et al. | Dec. 21, 1943 |
| 2,452,211 | Rosenthal | Oct. 26, 1948 |
| 2,526,423 | Rudorff | Oct. 17, 1950 |

FOREIGN PATENTS

| | | |
|---|---|---|
| 637,793 | Great Britain | May 24, 1950 |

OTHER REFERENCES

The Welding Engineer, July 1947, pp. 64, 68, 66.
The Iron Age, July 26, 1951, pp. 65 to 67.